United States Patent [19]

Allan et al.

[11] Patent Number: 4,759,017

[45] Date of Patent: Jul. 19, 1988

[54] TELECOMMUNICATIONS EXCHANGE ALLOCATING VARIABLE CHANNEL BANDWIDTH

[75] Inventors: Paul Allan, Santa Clara, Calif.; Keith E. Drage, Nottingham, England

[73] Assignee: Plessey Overseas Limited, Ilford, England

[21] Appl. No.: 868,911

[22] Filed: May 29, 1986

[30] Foreign Application Priority Data

Jun. 18, 1985 [GB] United Kingdom ............... 8515347

[51] Int. Cl.⁴ .............................................. H04J 3/24
[52] U.S. Cl. ......................................... 370/84; 370/85
[58] Field of Search ..................... 370/67, 79, 84, 85, 370/89, 95; 340/825.5, 825.52

[56] References Cited

U.S. PATENT DOCUMENTS

| | | | |
|---|---|---|---|
| 3,632,881 | 1/1972 | Graham | 370/79 |
| 4,251,880 | 2/1981 | Baugh et al. | 370/79 |
| 4,340,961 | 7/1982 | Capel et al. | 370/84 |
| 4,445,116 | 4/1984 | Grow | 370/89 |

FOREIGN PATENT DOCUMENTS 0046750 3/1983 Japan .................... 370/84
8404435 11/1984 World Int. Prop. O. ........... 370/84

OTHER PUBLICATIONS

"Telecommunications and the Computer", James Martin, Prentice-Hall, 1976, pp. 482-486.

*Primary Examiner*—Douglas W. Olms
*Assistant Examiner*—Melvin Marcelo
*Attorney, Agent, or Firm*—Michael F. Oglo; Julian C. Renfro

[57] ABSTRACT

In a time division multiplexed digital switching system intercommunication between telephony groups is by way of a serially operated data bus (2). Allocation of bandwidth on the data bus (2) is on a needs basis under control of a common control responsive (3) to requests from either applications processors or interface modules (10,20). The interface modules (10,20) receive addressing information from the common control (5) on a serially operated control bus (1) only when a change of status of a communication at least partly affecting that module (10,20) occurs. Such changes of status include new communication set-ups, communication cleardown, bandwidth increase and bandwidth decrease. Dynamic re-allocation of bandwidth of the data bus (2) occurs without affecting communications in progress.

7 Claims, 2 Drawing Sheets

TELECOMMUNICATIONS EXCHANGE ALLOCATING VARIABLE CHANNEL BANDWIDTH

The present invention relates to telecommunications exchanges and more particularly to telecommunications exchanges used for handling digital data or digitised voice signals.

Many small communications systems use time switched data buses to transfer voice and or data signals between terminals attached thereto. In such systems a number of channels are time separated on a serial or parallel data bus and each terminal is allocated a channel in which to transmit information and a channel in which to receive information. Terminals which are communicating are addressed in the particular allocated channels by way of an address bus from a central control processing system effecting a time-division multiplexed data interchange.

More recently bi-directional data buses have been introduced such that only a single time slot is required to permit data interchange between two terminals. Such systems are described in U.S. Pat. Nos. 4,564,938 to Boot entitled "DIGITAL ELECTRONIC SWITCHING SYSTEMS" and 4,569,040 to O'Toole and Boot entitled "ELECTRONIC SWITCHING SYSTEMS HAVING A TIME DIVISION MULTIPLEX SWITCH CONTROLLER ADDRESS BY CENTRAL CONTROL UNIT", both assigned to the assignee of the present application.

In the systems disclosed in the above mentioned Patent Applications two parallel address buses are used to address the two communicating terminals to cause both terminals to transmit and receive in the same time slot. The systems mentioned in the foregoing paragraphs require parallel data buses and address buses to use and limit to two the number of terminals which may be interconnected at any one time. Further, the control system must continually provide an addressing function to the communicating terminal.

It is an object of the present invention to provide a time division multiplexed digital telecommunications system which permits the interconnection of a multiplicity of terminals without requiring a continual addressing function to be provided by a central control system.

According to the present invention there is provided a telecommunications exchange comprising a plurality of interface units interconnected by a data bus, each of the interface units having a respective plurality of communications terminals attached thereto wherein a common control allocates to each terminal a required channel bandwidth on the data bus, said bandwidth being defined by a start address and a stop address, the addresses being forwarded to the interface units on a control bus between the common control and the interface units, each of the interface units including means to identify the current address on the data bus, means to compare the current address with the respective start and stop addresses for each terminal thereon and means to cause the respective terminals to start or stop transmitting and/or receiving when identity between the current address and the allocated start or stop address occurs.

Preferably the respective transmit and receive start and stop addresses are held in respective registers each of which is connected to a respective comparator arranged to forward start and stop signals to transmit and receive buffers associated with one of the respective terminals.

Each of the interfaces may include a plurality of transmit and receive start and stop address registers and switching means to select which of said registers shall provide the respective start and stop addresses in any particular cycle of the data bus, whereby the bandwidth allocated to any particular terminal may be adjusted by signals from the central control without loss of communication occurring.

The means to identify the current address on the data bus may be a counter which is responsive to clock pulses representing the transmission rate of the data bus. The counter may be periodically adjusted in response to signals on the data bus identifying a particular time channel thereon.

A telecommunications exchange in accordance with the invention will now be described by way of example only with reference to the accompanying drawings of which:

Figure 1:
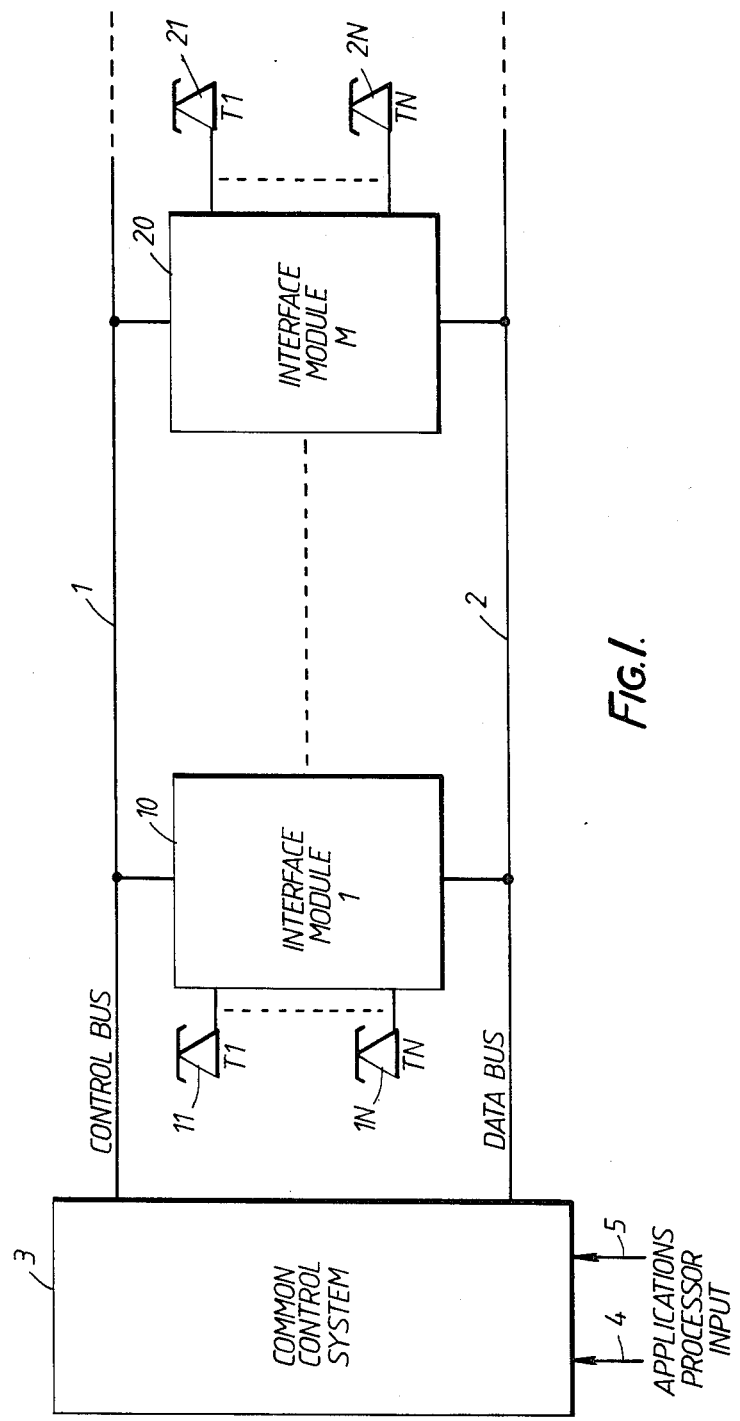
FIG. 1 shows a block schematic diagram of the exchange.

Referring first to FIG. 1, the exchange comprises a serially operated control bus 1 and a serially operated data bus 2 which transfer information between terminal units 11-1N, 21-2N respectively connected via interface units 10, 20 only two of which are shown.

A common control system 3 controls usage of the data bus 2 by forwarding control data by way of control bus 1 to the interface units 10, 20 in dependance upon the requirements for interconnection determined by applications processors (not shown) or by the interfaces, units 10,20 requesting bandwidth allocation from the common control 3 via the control bus 1 which forward data to the control system 3 by way of inputs 4, 5.

For the avoidance of doubt it is here noted that the terminal units 11-1N, 21-2N may be telephones or data terminals in any combination and there may be a mixture of telephones and data terminals on any particular interface unit 10, 20.

It is also noted that telephone instruments may be either of the kind including digital conversion (for example adapted to transmit and receive pulse code modulated (pcm) signals) or instruments providing analogue signals, the system providing facilities as hereinafter described for both kinds of telephone.

Figure 2:
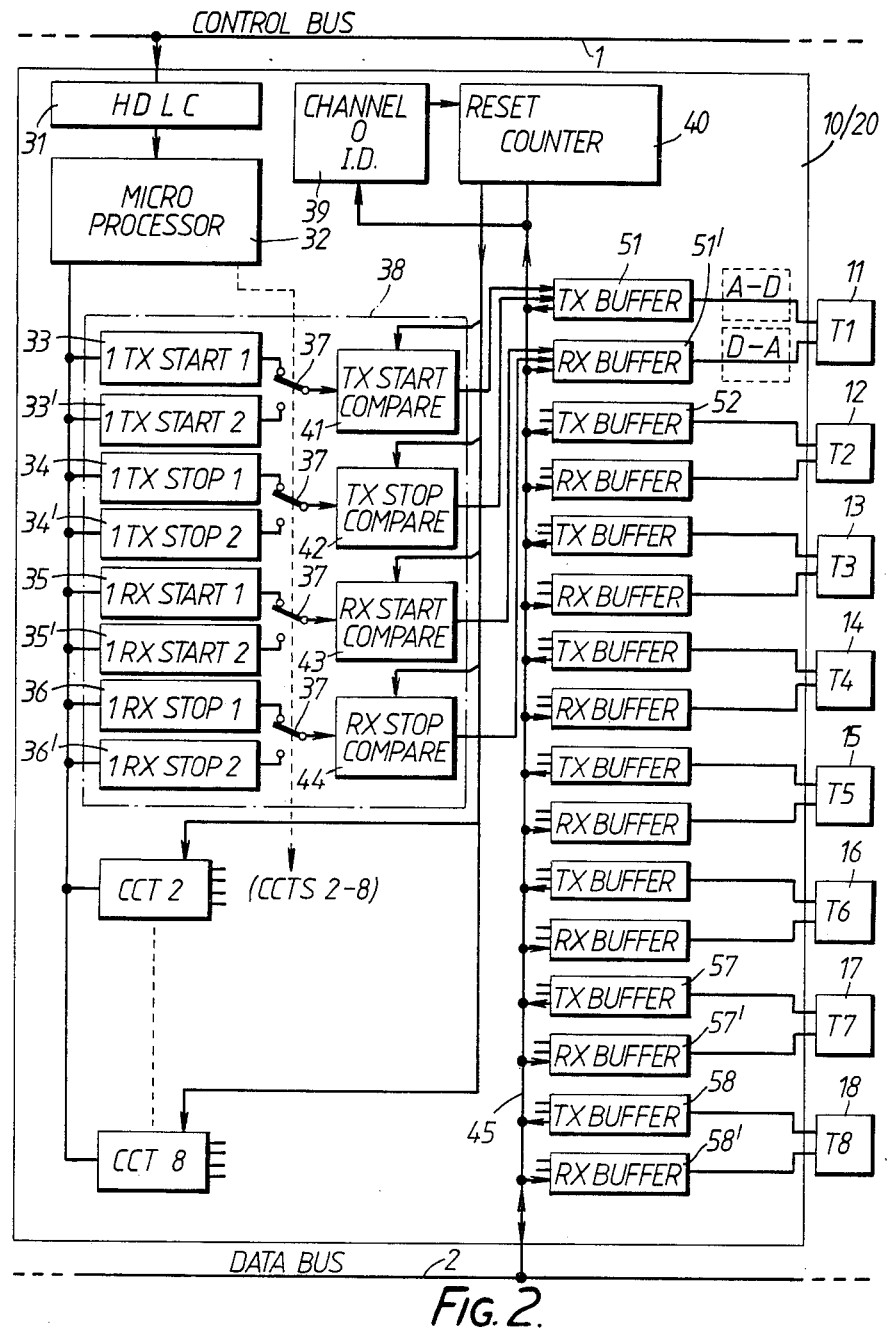
FIG. 2 shows a block schematic diagram of an interface unit of FIG. 1 in greater detail.

Referring also to FIG. 2 when an applications processor determines that a connection by way of the data bus 2 is required, the common control system 3 determines the required signalling bandwidth to be used by the terminals to be interconnected and selects a "channel" or "channels" to be used for transmission and reception by those terminals. It should be mentioned that the term "channel" as used herein does not define a fixed number of data bits to be transmitted in a fixed time slot since, with the exception of "channel zero", which is used for a specific purpose, time division of the data bus 2 is on a need basis.

Thus in one implementation, the data bus 3 operates at 128 mega bits and, whilst communication between telephone instruments may require only a 64 kilo bit channel for example, communication between data terminals may require, say, a 256 kilo bit channel.

Having determined the channels to be used by the terminals to be interconnected the control system 3 fowards control data to each interface unit 10, 20 on which one or more of the communicating terminals is situated. The control data comprises a transmit start address, a transmit stop address, a receive start address and a receive stop address.

In the interface unit, say 10, the control data is received from the control bus 1, which operates as a serial bus as hereinbefore mentioned, by way of a high level data link controller (HDLC) 31, by a microprocessor 32. The microprocessor 32 sorts the received control data and determines whether the system is currently operating with addressing sequence one or addressing sequence two and causes the start and stop data to be stored appropriately in transmission and receive start and stop address registers, say, 33-36.

It will be realised that the start and stop address registers 33-36 may be combined in a data store each register being an addressable word of that store. It will also be appreciated that for simplicity only one complete set of such registers and comparators associated therewith have been shown. It is here noted that the blocks enclosed within a chain dash line 38 are repeated for each of the terminals 11-18 shown in FIG. 2 as indicated by circuits 2-8.

The operation of the interface units 10, 20 will now be described with reference to FIG. 2. As previously mentioned the data bus 2 operates at 128 mega bits. At one point the data bus 2 carries a channel zero identification, which is identified by an identifying circuit 39 which causes a counter 40 to reset to zero.

The counter 40 counts at the data bus rate and provides current data bus address signals to a number of comparators 41-44. Consider first the comparator 41 which compares the transmission start address from the register 33 with the address provided by the counter 40. When identity occurs the comparator 41 forwards a start signal to a transmit buffer 51 which is associated with the terminal 11. The transmit buffer 51 now commences output on a bus 45 to the data bus 2 and continues to transmit until stopped by a stop signal which is received from the comparator 42 when identity occurs between the address held in the register 34 and the address provided by the counter 40.

Thus information received from the terminal 11, held by the transmit buffer 51, is transferred to the data bus 2 on a first in - first out (FIFO) basis.

Now for reception, when the comparator 43 detects identity between the address held in the register 35 and the address from the counter 40 it provides a start signal to a receive buffer 51' associated with the terminal 11. Once the receive buffer 51' receives a start signal it commences reading the data on the bus 45 and storing same for transfer on a FIFO basis to the terminal 1. Again the buffer 51' continues to read data (effectively from the data bus 2) until it receives a stop signal from the comparator 44, the stop signal being provided when identity occurs between the address held in the register 36 and the address from the counter 40.

Thus once the control system (3 of FIG. 1) has forwarded the control data on the control bus 1, no further intervention by the system is necessary until some change of status of the system data bus 2 is required.

Accordingly, to effect a two party communication, the control system 3 provides one start and stop address to each interface unit 10, 20 for one party to transmit and the second party to receive and another start and stop address for the one party to receive and the second party to transmit.

If a communication between more than two parties is required then provided that the parties have a suitable transmit protocol it is simply necessary for the control system to forward start and stop transmission addresses and start and stop receive addresses for each of the parties. Thus if say, one terminal was to transmit data to be disseminated to four receiving terminals then the interface 10, 20 to which the first party is connected receives an address at which that terminal is to start and stop transmitting and each interface which the other four parties are connected receives the same addressing to start and stop receiving.

Certain advantages of this system are immediately apparent. Multiway communication is possible on the system and a transmitting terminal may use any bandwidth up to the maximum capacity of the system. In practice the bandwidth allocated to the terminals 11-1N, 20-2N, is allocated in multiples of eight kilo bits up to the capacity of the data bus 2 in the case of a 128 mega-bit bus for example using a sixteen-bit addressing system. In this specific case, the counter 40 only requires to count every eight kilo bits and the comparator 41-44 and address registers 33-36 only need to be sixteen bits wide.

It will be appreciated that the interface unit 10, with the exception of the HDLC 31 and the microprocessor 32 may be implemented in a single uncommitted logic array (ULA) or as a very large scale integrated (VLSI) circuit.

We will now consider another feature of the present exchange which is the ability of the system to effect dynamic reallocation of the bandwidth of the data bus 2 to accomodate changing demands without affecting any communication in progress. To effect this, linked electronic switches 37 are provided which are controlled by the microprocessor 32 in response to signals received from the central control system 3.

If the control system 3 determines that a terminal requires additional (or less) bandwidth than is currently allocated for its use, then it may cause new control information to be forwarded by way of the control bus 1 to the affected interface units 10, 20. The data forwarded includes an indication that it is to be used as the addressing on the "next" transmit or receive cycle.

Accordingly, the microprocessor 32 causes the newly received data to be stored in the registers 33'-36' and on occurence of, say, channel zero (or another appropriate synchronisation signal) causes the electronic switches 37 to change over. In this way, if complete re-allocation of the bandwidth of the data bus 2 were to be required for, say, reducing bandwidth allocated to some communications and increasing bandwidth allocated to other communications the control system 3 may cause all the interfaces to switch concurrently every receive and transmit address without any loss of data transmission to any terminal.

As has been previously mentioned the exchange may accomodate not only data terminals having varying bandwidth requirements but also digital and analogue telephone instruments. Should analogue telephone instruments be used with the sytem then analogue-to-digital converters and digital to analogue converters or codecs may be interposed between the transmit and receive buffers 51, 51' etc, and the output of the interface units 10, 20 to their respective terminals.

It will be noted that should any counter 40 come out of step with the data being transmitted on the data bus 2 for any reason, the channel zero identification circuit 39 will effect a correction of the counter on the next cycle.

Whilst as herein described the data bus 2 has been referred to as a high speed bit serial bus it will be realised that the operation of the system with a 128 megabit serial bus or as a parallel data bus say using sixteen eight mega bit buses as a high speed serial data bus is an alternative which may be used. In this case, the communications protocol used on the control bus may be a form of High Level Data Link Control (HDLC).

It will also be appreciated that two serial data buses may be provided such that concurrent two way transmission between communicating terminals occurs. In such a case, only one start and one stop address per terminal is required these being used as common transmit and receive start and stop addresses.

We claim:

1. A telecommunications exchange, comprising:

a common control means, a plurality of interface units, a control bus interconnecting the common control means with the plurality of interface units, and each interface unit having a plurality of communications terminals connected thereto;

a data bus interconnecting the interface units for passing data therebetween in a time division multiplexed scheme which provides in each cycle of operation a predetermined number of time sequential data bit positions, and each interface unit including means for providing the time sequential address of the currently available data bit position on the data bus;

each interface unit including register means associated with each terminal connected thereto for storing a start and stop address, between which addresses the terminal may transmit or receive data on the data bus during each said cycle of operation, means for comparing said time sequential address of the currently available data bit position with the start and stop addresses stored in the register means, and means responsive to the result of said comparison to start and stop transmission or reception of the respective terminal;

and the common control means being operable in response to desired terminal interconnections for transmitting on the control bus start and stop address for the terminals to be interconnected for storage in the respective associated register means, thereby allocating a desired channel bandwidth to the terminal interconnection.

2. A telecommunications exchange as claimed in claim 1 wherein each of the interface units has respective transmit start, transmit stop, receive start and receive stop registers in respect of each communications terminal thereon, each register addressing a respective comparator which is arranged to forward a start signal or a stop signal to a respective transmit or receive buffer associated with a respective one of the terminals.

3. A telecommunications exchange as claimed in claim 1 in which the current address of the data bus is identified by a counter which is responsive to clock pulses representing the transmission rate of the data bus.

4. A telecommunications exchange as claimed in claim 3 in which the counter is periodically adjusted in response to signals on the data bus identifying a particular address thereof.

5. A telecommunications exchange as claimed in claim 1 in which the data bus is divided into two parallel buses to permit synchronous transmission and reception of data whereby respective transmit and receive addresses are identical.

6. A telecommunication exchange comprising a plurality of interface units having a respective plurality of communications terminals attached thereto wherein a common control allocates to each terminal a required channel bandwidth on the data bus, said bandwidth being defined by a start address and a stop address, the addresses being forwarded to the interface units on a control bus between the common control and the interface units, each of the interface units including means to identify the current address on the data bus, means to compare the current address with the respective start and stop addresses for each terminal thereon and means to cause the respective terminals to start or stop transmitting and/or receiving when identity between the current address and the allocated start or stop address occurs, in which each of the interface units has a respective plurality of transmit start, transmit stop, receive start and receive stop registers in respect of each communications terminal thereon, each interface unit including respective transmit start, transmit stop, receive start and receive stop comparators arranged to provide start and stop signals to transmit and receive buffers associated with a respective one of the terminals, and switching means selects respective ones of the registers to provide signals to said comparison means in each cycle of the data bus whereby the bandwidth allocated to any particular terminal can be adjusted by signals from the common control without loss of communication occurring.

7. A telecommunications exchange comprising a plurality of interface units having a respective plurality of communications terminals attached thereto wherein a common control allocates to each terminal a required channel bandwidth on the data bus, said bandwidth being defined by a start address and a stop address, the addresses being forwarded to the interface units on a control bus between the common control and the interface units, each of the interface units including means to identify the current address on the data bus, means to compare the current address with the respective start and stop addresses for each terminal thereon and means to cause the respective terminals to start or stop transmitting and/or receiving when identity between the current address and the allocated start or stop address occurs, in which each terminal can be allocated a plurality of receive start and receive stop addresses whereby a receiving terminal can receive data from a plurality of transmitting terminals to permit multiway communications.

* * * * *